K. SIXMA.
FITTING FOR ELECTRICAL CONDUITS.
APPLICATION FILED MAY 5, 1914.
1,229,665.
Patented June 12, 1917.
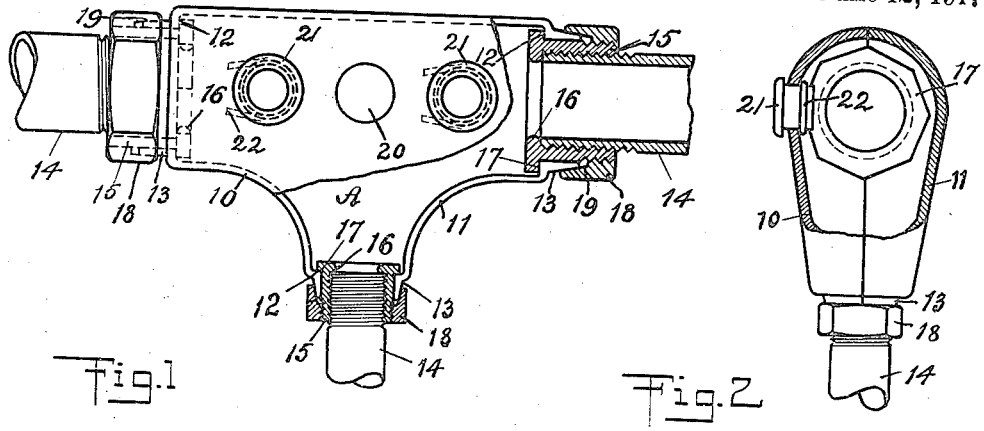
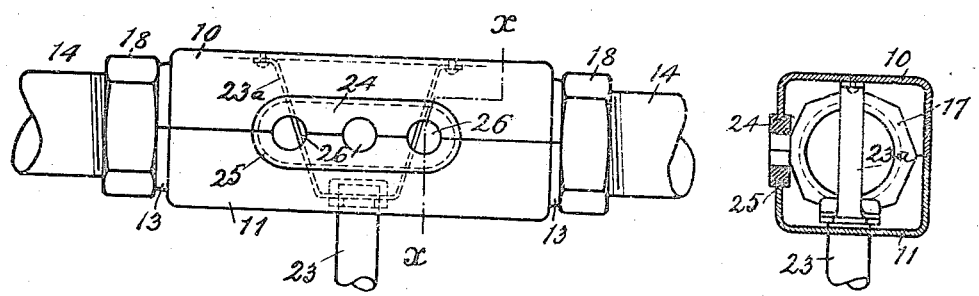
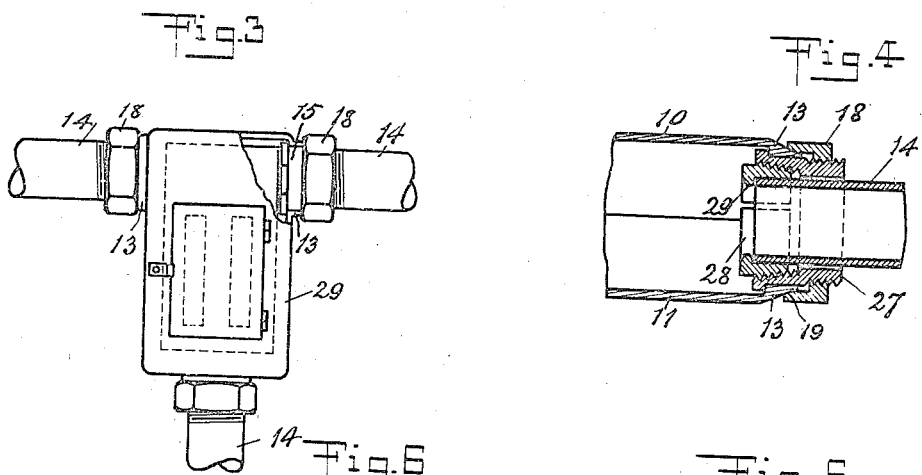
WITNESSES
INVENTOR

UNITED STATES PATENT OFFICE.

KLAAS SIXMA, OF BROOKLYN, NEW YORK.

FITTING FOR ELECTRICAL CONDUITS.

1,229,665.  Specification of Letters Patent.  Patented June 12, 1917.

Application filed May 5, 1914. Serial No. 836,451.

*To all whom it may concern:*

Be it known that I, KLAAS SIXMA, a subject of the Queen of the Netherlands, residing at Brooklyn, in the county of Kings and State of New York, have invented new and useful Improvements in Fittings for Electrical Conduits, of which the following is a specification.

The present invention relates to improvements in that class of fittings for electrical conduits which are described in my Patent No. 1,108,259, dated August 25th, 1914.

This invention relates substantially to fittings for electrical conduits such as used in wiring a building for electricity, or for tapping a street main.

Heretofore these fittings have been made in two halves, with extending lugs and bolted together with screws or bolts, through these lugs.

The object of the present invention is to provide a conduit fitting with an externally threaded bushing, which may be used with or without internal threads to coact with threads on the conduit.

And another object of the invention is to provide a conduit fitting whereby it will be possible to connect conduits that are not threaded.

Still another object of the invention is to provide a conduit fitting with outward extending tapered nipples, which are held together with tapering lock nuts, and is capable to be easily put together and taken apart in case of repairs. These fittings may also be used as a substitute for a pull-box as well as a connector for open wiring.

These fittings can be made into any desired shape and size, such as T's, crosses, elbows, couplings, fuseboxes or any other shape as the trade may require.

The invention consists of novel features and parts, and combinations of same, which will be more fully described hereinafter and then pointed out in the claims.

A practical embodiment of my invention is represented in the accompanying drawings, forming part of this specification, in which similar characters of reference indicate corresponding parts in all the views.

Figure 1 is an elevation partly broken away and shown in section, of a T of my preferred construction of a fitting.

Fig. 2 is an end view of same, partly broken away.

Fig. 3 is an elevation of a coupling which can be used as a pull-box, with insulating material held in position for outside wiring.

Fig. 4 is a section on line x—x of Fig. 3.

Fig. 5 is a fragmentary sectional elevation of a modified form of the fitting, showing a conduit without threads connected thereto, and Fig. 6 is a side elevation of a fuse box connected to conduits.

Referring to Fig. 1 of the drawings it will be seen that the conduit fitting A is made in the shape of a reducing T and may be made of any suitable material, such as cast or pressed metals or fiber and is made in two halves 10—11, which are made identical with each other. The outer ends of the T are made somewhat contracted, thereby forming inside shoulders 12 and terminating with tapering nipples 13.

Over the threaded ends of the conduits 14 are screwed bushings 15. These bushings have at their inner ends inwardly extending rounded rims 16 which form stops for the conduits 14 and serve as protection for the wires, also outwardly extending angular shoulders 17 which coact with shoulders 12 of the conduit fitting A.

The outer ends of bushings 15 are threaded to receive locknuts 18 which have inside tapering portions 19 which coact with tapered nipples 13 of the body sections 10—11.

It will now be seen that when assembling: The locknuts 18 are first slipped over the conduits. The bushings 15 are then screwed home on their respective conduits 14. The fitting members 10—11 are now placed over these bushings. The shoulders 17 of the bushings 15 will bear against the inside shoulder 12 of the fitting members 10—11 and are held there by hand until locknuts 18 are screwed against the tapering nipples 13 of the fitting members 10—11, which will force the main portions 10—11 together and hold them secure and it will be impossible to jar them loose.

These fittings may be provided with the usual "knock outs" 20, shown in Fig. 1, when a connection for open wiring is desired, these "knock outs" may be removed and insulating bushings 21 inserted and held in position with springs 22, now in common use.

In Fig. 3 I have shown a coupling used as a pull-box. The lower conduit 23 is suspended from a bracket 23ª fastened to the upper part of the fitting member 10. The object of this construction is when the coupling is taken apart, the conduit 23 will remain in fixed position. The insulating plate 24 with groove 25 into which the fitting members 10—11 fit, may be provided with any required number of holes 26 for the reception of wires to be used.

As indicated in Fig. 5, by mounting a split ring 28 on the end of the conduit for engagement with the bushing 27, the threads on the conduit can be omitted. The bushing 27 has at its inner end an internal conical thread into which is screwed a split ring or bushing 28 which has an external conical thread. This ring 28 has an inwardly extending annular rounded rim 29, which forms a stop for the conduit, and serves as protection for wires from the sharp edge of the conduit.

In assembling, the locknut 18 is first slipped over the conduit 14. The split ring 28 is partly screwed into the bushing 27, and then slipped over the end of the conduit 14. The bushing 27 is now screwed onto the ring 28 until it grips the conduit 14 and holds it securely. The whole is then assembled as before described.

Fig. 6 illustrates a fuse-box 29 connected to conduits 14. The connection is made same as before described.

I claim:—

1. In a conduit fitting of the kind described the combination with a sectional body provided with a tubular tapered nipple, a conduit fitted in the nipple, a threaded bushing to engage the conduit, and a lock nut mounted on the threads of the bushing and coacting with the tapered portion of the nipple.

2. In a conduit fitting of the kind described the combination with a sectional body provided with a tubular tapered nipple, a threaded conduit fitted in the nipple, a threaded bushing to engage the threads of the conduit, a lock nut to engage the threads of the bushing and coact with the tapered portion of the nipple.

3. In a conduit fitting of the kind described the combination with a sectional body provided with a tubular tapered nipple, a threaded conduit fitted in the nipple, a bushing having exterior and interior threads the latter for engagement with the threads of the conduit, a lock nut to engage the exterior threads of the bushing and coact with the tapered portion of the nipple.

In testimony whereof I have hereunto set my hand in the presence of two subscribing witnesses.

KLAAS SIXMA.

Witnesses:
JOHN A. BERGSTROM,
CHRISTIAN H. OLMSTAEDT.